US 6,533,677 B1

(12) United States Patent
Sumitomo et al.

(10) Patent No.: US 6,533,677 B1
(45) Date of Patent: Mar. 18, 2003

(54) GOLF CLUB SHAFT

(75) Inventors: Norio Sumitomo, Hyogo (JP); Masahide Onuki, Hyogo (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 0 days.

(21) Appl. No.: 09/369,312

(22) Filed: Aug. 6, 1999

(30) Foreign Application Priority Data

Sep. 17, 1998 (JP) .......................................... 10-263292
Apr. 16, 1999 (JP) .......................................... 11-109085

(51) Int. Cl.$^7$ .......................... H63B 53/10; H63B 53/12
(52) U.S. Cl. ...................................... 473/316; 473/319
(58) Field of Search ................................ 473/318, 319, 473/320, 298, 428

(56) References Cited

U.S. PATENT DOCUMENTS 5,326,099 A * 7/1994 Yamamoto et al. ........ 273/80.2
5,421,573 A * 6/1995 Kawamatsu ............... 273/80 B
5,897,447 A * 4/1999 Nishihara .................. 473/535

FOREIGN PATENT DOCUMENTS

JP 3227616 10/1991
JP 10071220 3/1998
JP 10328338 12/1998
JP 11076480 3/1999

* cited by examiner

Primary Examiner—Steven Wong
(74) Attorney, Agent, or Firm—Birch, Stewart, Kolasch & Birch, LLP

(57) ABSTRACT

A golf club shaft comprising a laminate of a plurality of fiber reinforced resinous layers formed of one pair of angle layers consisting of a first angle layer and a second angle layer or a plurality of pairs of angle layers consisting of the first and second angle layers such that a fiber of the first angle layer and that of the second angle layer incline in opposite directions at an angle 20°–35° with respect to an axis of the golf club shaft. The first angle layer and the second angle layer are wound by 1.5 turns in a cross-sectional face of the golf club shaft. A winding start point of the first and that of the second angle layers are dislocated at 180° in a circumferential direction of the golf club shaft. In a cross-sectional face of the golf club shaft, a part consisting of two first angle layers and one second angle layer layered one upon another and a part consisting of one first angle layer and two second angle layers layered one upon another are formed.

5 Claims, 11 Drawing Sheets

GOLF CLUB SHAFT

BACKGROUND OF THE INVENTION

1. Field of the Invention

Generally, the present invention relates to a golf club shaft and more particularly to an anisotropic golf club shaft which has an improved strength, is produced with a high productivity, and is lightweight.

2. Description of the Related Art

Needless to say, it is advantageous to hit a golf ball straight to get a good score and hit it a long distance. However, many golfers puzzle over the fact that golf balls they hit are likely to be curved, i.e., they hit a so-called hook ball or a so-called slice ball.

The golf ball is curved because the orientation of the orbit of a club head and the orientation (orientation of line normal to face of club head) of the face of the club head are not coincident with each other at an impact time. That is, when the face (orientation of line normal to face of club head) of the club head is directed to the right with respect to the orbit of the club head, the golf ball is curved to the right (slice in the case of right-handed player), whereas when the face of the club head is directed to the left with respect to the orbit of the club head, the golf ball is curved to the left (hook in the case of right-handed player).

Thus, to hit the golf ball straight to an aimed direction, it is necessary to correct the orientation of the face of the club head at an impact time. But it is not easy to correct a swinging form. Thus, many players puzzle over how to correct their swinging forms.

In Japanese Laid-Open Patent Publication No. HEI3-227616, the present applicant describes that in a hollow or solid shaft having an anisotropic material such as fiber reinforced resin or the like formed at at least one part of the shaft, it is possible to differentiate the principal elastic axis of the shaft from the principal geometric axis by differentiating (varying) a fibrous angle of the anisotropic material partly in the circumferential direction of the shaft and at at least one part of the shaft in the thickness direction thereof. In this manner, the principal elastic axis can set at an arbitrary position.

In the hollow shaft in which the principal elastic axis is differentiated from the principal geometric axis, when a load is so applied downward to the shaft that the load does not pass through a point located on the principal elastic axis, the hollow shaft is flexed and twisted, as shown in FIGS. 10 and 11. That is, as shown in FIG. 10, supposing that one end of a hollow shaft 10 is denoted by 10c and that the other end thereof is denoted by a free end 10d, a principal elastic axis E is not coincident with a principal geometric axis G, and the free end 10d is positioned upward from a point Q located on the principal elastic axis E. When a load W not passing through the point Q located on the principal elastic axis E is applied to the free end 10d of the shaft 10, the shaft 10 is flexed and twisted, as shown in FIG. 11.

The present applicant proposed a golf club to which a hollow shaft having the above-described anisotropic property is applied, as disclosed in Japanese Patent Application No. HEI9- 146950. According to the disclosure made therein, the shaft is twisted by the flexure thereof when the golf club is swung so that when a hooker or a slicer uses the golf club, the orientation (orientation of line normal to face of club head) of the face of the club head is self-corrected. In the golf club, the club head is installed on the front end of the anisotropic shaft which is flexed and twisted such that a line normal to the face of the club head is oriented to the direction in which a golf ball is to be flied, i.e., the face of the club head is oriented to a specific direction owing to twisting of the shaft at a desired angle caused by flexure thereof which occurs when the golf club is swung.

In the above Japanese Patent Application No. HEI9-146950, an anisotropic shaft is manufactured by winding on a mandrel a semicircumference-long prepreg in a region of $0° \leq \theta < 180°$ (first semi-circumference region) and in a region of $180° \leq \theta < 360°$ (second semicircumference region) in the circumferential direction of the shaft, respectively such that reinforcing fibers of both prepregs incline in opposite directions with respect to the axial direction of the shaft. A plurality of one circumference-long layers each consisting of two semicircumference-long prepregs inclining in opposite directions with respect to the axial direction of the shaft is wound one upon another on the mandrel to produce the anisotropic shaft. According to this method, an uncontinuous portion (seam of prepregs: dividing line) of the reinforcing fibers is formed in the boundary between the first and second semicircumference regions of the prepreg corresponding to one circumference of the shaft. Thus, the strength of the shaft is low at the uncontinuous portion. Further, two semicircumference-long prepregs are wound per one circumference of the shaft. Thus, it takes long to manufacture the golf club shaft and further, there may be a variation in the characteristics of products.

In Japanese Laid-Open Patent Publication No. HEI10-71220, there is proposed a golf club shaft which is flexed and twisted (flexed and twisted around the axis) similarly to the golf club shaft disclosed in Japanese Patent Application No. HEI9-146950. According to the disclosure, a shaft is divided into two circular-arcs in a cross-sectional face of the shaft to divide the shaft into two regions along the longitudinal direction (axial direction) of the shaft; and semicircumference-long prepregs are layered one upon another in the two regions such that the fibrous direction, amount of fiber, and resin impregnation amount of a prepreg positioned in one region are different from those of a prepreg positioned in the other region. However, because the semicircumference-long prepregs are layered one upon another in the two regions partitioned along the longitudinal direction (axial direction) of the shaft, an uncontinuous portion (seam of prepregs: dividing line) of the reinforcing fiber is formed in the boundary between the first and second semicircumference regions of the prepreg corresponding to one circumference of the shaft. Consequently, there is a variation in the characteristics of products.

The present applicant proposed a golf club shaft and a method of manufacturing the golf club shaft, as disclosed in Japanese Patent Application No. HEI9-242340 to solve the disadvantage of the anisotropic shaft in which the dividing line is formed on the cross-sectional face of the shaft because two semicircumference-long prepregs are wound per one circumference of the shaft.

In the golf club shaft and the method of manufacturing the golf club shaft, a hoop layer whose reinforcing fiber is substantially perpendicular to the axial direction of the shaft is layered one upon another on the boundary (uncontinuous portion of reinforcing fibers) between the first semicircumference region consisting of one semicircumference-long prepreg whose reinforcing fiber inclines in one direction and the second semicircumference region consisting of the other semicircumference-long prepreg whose reinforcing fiber inclines in the opposite direction. This construction has been devised to prevent deterioration of the strength of the boundary between the first and second semicircumference regions. Two semicircumference-long prepregs whose reinforcing fibers incline in opposite directions with respect to the axis of the shaft are bonded to the hoop layer to prepare a composite prepreg sheet in advance. The composite prepreg sheet is wound on the peripheral surface of a molding core material (mandrel) to manufacture the golf club shaft in a shorter period of time and reduce the degree of variation in the characteristics of products.

In the proposal disclosed in Japanese Patent Application No. HEI9-242340, it is possible to allow the strength and productivity of the shaft to be higher than those of the shaft not provided with the hoop layer. But the shaft has a seam (boundary between two semicircumference-long prepregs) present in one turn of the prepreg wound on one circumference of the shaft. Thus, the strength of the shaft is still low.

It is ideal that the edges of the two prepregs are butted each other at the seam without forming a gap therebetween and without overlapping them on each other. But it is difficult to butt them each other in such an ideal state in factories because they are operated for a mass production. Thus, there is necessarily a variation in the characteristics of products. In other words, in order to accomplish such an ideal butting of the prepregs, it is necessary for skilled operators to work without sparing any effort and time, which lowers the productivity of the shaft greatly. Even though the edges of the two prepregs are butted each other at the seam without forming a gap there between and without overlapping them on each other, the presence of the seam cannot be ignored in view of the durability of the shaft.

In the case of the conventional normal shaft (isotropic shaft: principal elastic axis and principal geometric axis are coincident with each other), in order to allow the shaft to have a uniform property in its circumferential direction, not a prepreg having a length corresponding to a semicircumference of the shaft but a prepreg having a length corresponding to at least one circumference thereof is wound thereon. In the case of the anisotropic shaft, semicircumference-long prepregs are used. Thus, when the same amount of prepreg is used to manufacture the anisotropic shaft and the normal shaft, the total number of prepregs to be used for the former is more than that of prepregs to be used for the latter. Further, in the former, it is necessary to butt two prepregs each other for each one circumference of the shaft, and furthermore, it is troublesome to handle semicircumference-long prepregs. Thus, the productivity of the anisotropic shaft is low.

Needless to say, a lightweight golf club shaft is advantageous for improving the flight distance of a golf ball. It is difficult for most amateur players to swing a heavy shaft at a high head speed and thus difficult to hit a golf ball a long distance except high-level players, professionals, players whose arms have high muscular strengths. Thus, research and development are being made to improve the material of a prepreg and shaft-manufacturing technique to thereby produce a lightweight normal shaft (not having anisotropy). Research and development are also being made to improve an anisotropic shaft which is lightweight and has a high degree of strength and productivity.

SUMMARY OF THE INVENTION

The present invention has been made in view of the above-described situation. Thus, it is an object of the present invention to provide an anisotropic golf club shaft which flexes and twists and has a high degree of strength and productivity and is lightweight.

In order to achieve the object, there is provided a golf club shaft comprising a laminate of a plurality of fiber reinforced resinous layers formed of one pair of angle layers consisting of a first angle layer and a second angle layer or a plurality of pairs of angle layers consisting of the first and second angle layers such that a fiber of the first angle layer and that of the second angle layer incline in opposite directions at an angle 20°–35° with respect to an axis of the golf club shaft. The first angle layer and the second angle layer are wound by 1.5 turns in a cross-sectional face of the golf club shaft. A winding start point of the first and that of the second angle layers are dislocated at 180° in a circumferential direction of the golf club shaft. In a cross-sectional face of the golf club shaft, a part consisting of two first angle layers and one second angle layer layered one upon another and a part consisting of one first angle layer and two second angle layers layered one upon another are formed to differentiate constructions consisting of the first and second angle layers of both of the parts.

In the construction, by merely winding the first and second angle layers by 1.5 turns, one of the part consisting of two first angle layers and one second angle layer layered one upon another and the part consisting of one first angle layer and two second angle layers layered one upon another is positioned in a first semicircumference region (region of $0°\leq\theta<180°$) of the shaft in its circumferential direction, and the other of the two parts is positioned in a second semicircumference region (region of $180°\leq\theta<360°$) thereof. Consequently, the layered construction (orientation state of reinforcing fiber) of the angle layer of the one part and that of the angle layer of the other part are different from each other. Thus, unlike the conventional anisotropic shaft, namely, without winding a plurality of one circumference-long layers each consisting of two semi circumference-long angle layers (prepregs) inclining in opposite directions with respect to the axis of a shaft one upon another, it is possible to flex and twist the shaft and allow the shaft to have anisotropy. Thus, there is not a seam in each angle layer per one circumference of the shaft and thus the anisotropic shaft of the present invention is allowed to have a higher degree of strength than the conventional anisotropic shaft.

Because no semicircumference-long prepreg is used, it is unnecessary to butt edges of the semicircumference-long prepregs each other and hence possible to shorten the manufacturing period of time and improve the productivity.

In the conventional anisotropic shaft in which semicircumference-long prepregs whose reinforcing fibers incline in opposite directions with respect to the axis of the shaft are wound in the first semicircumference region ($0°\leq\theta<180°$) and the second semicircumference region ($180°\leq\theta<360°$) of the shaft in its circumferential direction, the inclination of the reinforcing fiber of the semicircumference-long prepreg with respect to the axis of the shaft is set to 40°–45°. This is for the reason described below. That is, the inclination of a reinforcing fiber of a bias layer (layer whose reinforcing fiber inclines with respect to the axis of shaft) formed to allow a normal shaft not having anisotropy to secure a twist rigidity and a twist strength is generally set to 40°–45°, which is applied to the above-described inclination of the reinforcing fiber of the semicircumference-long prepreg which imparts anisotropy to the shaft. Unlike the conventional anisotropic shaft, according to the present invention, the inclination (orientation angle) of the reinforcing fiber of the first angle layer and that of the reinforcing fiber of the second angle layer with respect to the axis of the shaft are set to the angle 20°–35°. Thus, compared with the case where the inclinations (orientation angle) thereof are set to other angles, the shaft has a greater twist amount when a certain load is applied to the shaft and has a higher degree of bending rigidity. Thus, it is possible to construct the shaft having a smaller number of fiber reinforced resinous layers (prepregs) and having an anisotropy and a higher degree of bending rigidity. Thus, the shaft is allowed to be more lightweight than the conventional shaft.

It is preferable that in the anisotropic shaft of the present invention, a plurality of pairs of angle layers consisting of the first and the second angle layers is formed; that winding start positions of the first angle layers are equivalent to each other in the circumferential direction of the golf club shaft; and that winding start positions of the second angle layers are equivalent to each other in the circumferential direction of the golf club shaft. Consequently, the constructions of the first and second angle layers are equivalent to each other, which prevents an anisotropy displayed by one angle layer from being offset by an anisotropy displayed by the other angle layer. Accordingly, the shaft can display an anisotropy efficiently.

It is preferable that in the anisotropic shaft of the present invention, the fiber reinforced resinous layers include a hoop layer whose fiber inclines at 90° with respect to the axis of the golf club shaft and a straight layer whose fiber inclines at 0° with respect to the axis of the golf club shaft; that the hoop layer and the straight layer are wound by one turn or integral turns in the circumferential direction of the golf club shaft by dislocating a winding start position of the hoop layer and that of the straight layer by 90° from a winding start position of the first angle layer and that of the second angle layer in the circumferential direction of the golf club shaft; and that a dividing line (the winding start position of the first angle layer and that of the second angle layer) is not consistent with the winding start position of the hoop layer and the straight layer. Owing to the construction, the shaft has a higher degree of strength than the conventional anisotropic shaft.

It is preferable that the second angle layer is positioned directly on a periphery of the first angle layer by locating a winding start point of the second angle layer in continuation from a winding termination point of the first angle layer; that the hoop layer is positioned on a periphery of the second angle layer; and that the straight layer is positioned on a periphery of the hoop layer such that the straight layer is positioned on an outermost surface. Owing to the construction, it is possible to allow the part consisting of two first angle layers and one second angle layer layered one upon another and the part consisting of one first angle layer and two second angle layers layered one upon another to be opposed to each other without the two parts being apart from each other a long distance. Thus it is possible to impart an anisotropy to the shaft efficiently.

In the present invention, as the reinforcing fiber of the fiber reinforced resin, it is possible to use a glass fiber, a carbon fiber, various organic fibers, an alumina fiber, a silicon carbide fiber, a metal fiber, fibers consisting of a mixture of these fibers, a woven cloth or a mat. As resin, it is possible to use polyamide, epoxy, polyester, and the like.

It is possible to form the entire golf club shaft of only the fiber reinforced resinous layer. But in addition to the fiber reinforced resinous layer, it is possible to use an anisotropic material layer such as a fiber reinforced rubber layer and a rubber layer having an orientation in combination. In addition, it is possible to form a part of the golf club shaft of resin or rubber not containing fiber.

The angle layer which allows the shaft to flex and twist may be formed partly thereon in its axial direction. That is, the angle layer may be provided on the shaft entirely or partly in its axial direction.

DETAILED DESCRIPTION OF THE PREFERRED EMBODIMENTS

Figure 1A:
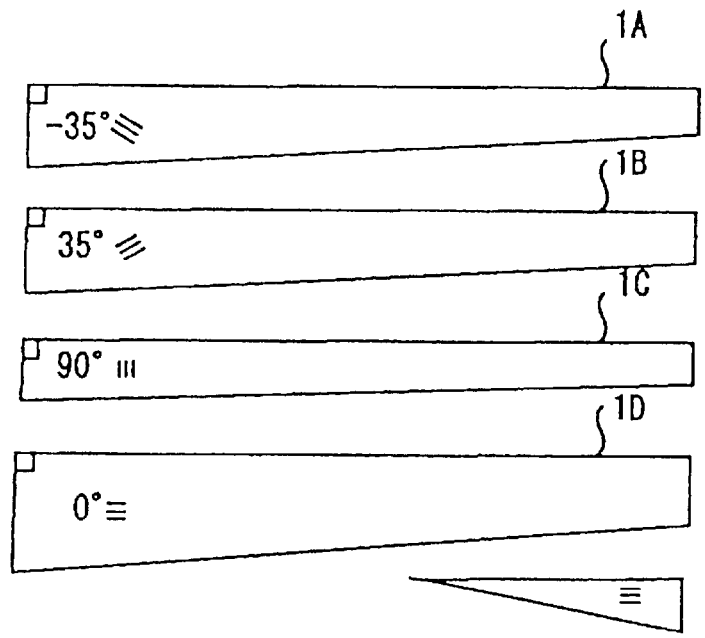
FIG. 1A is a development view showing a prepreg constituting a shaft of a first embodiment of the present invention.
Figure 1B:
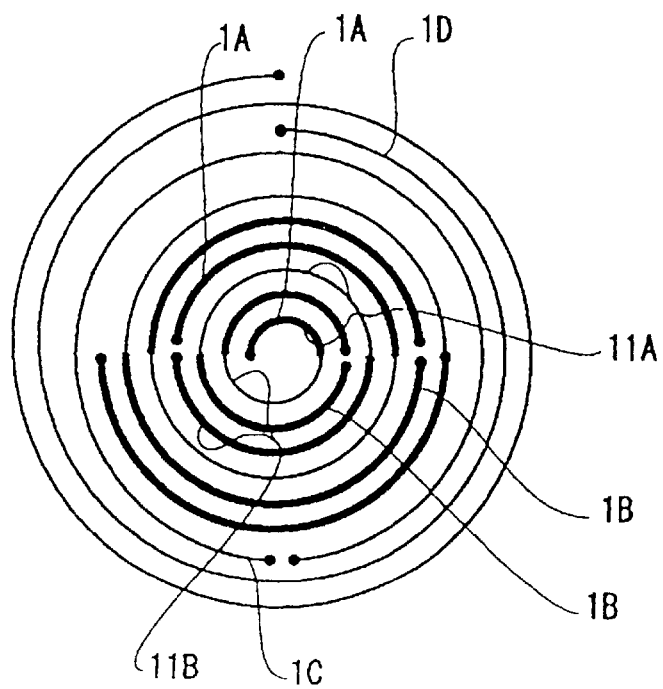
FIG. 1B shows a winding state of the prepreg shown in FIG. 1A.
Figure 2A:
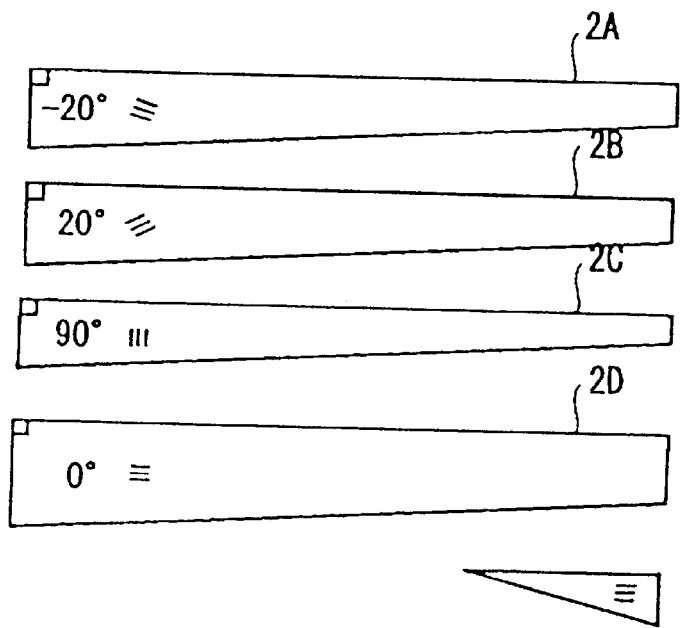
FIG. 2A is a development view showing a prepreg constituting a shaft of a second embodiment.
Figure 2B:
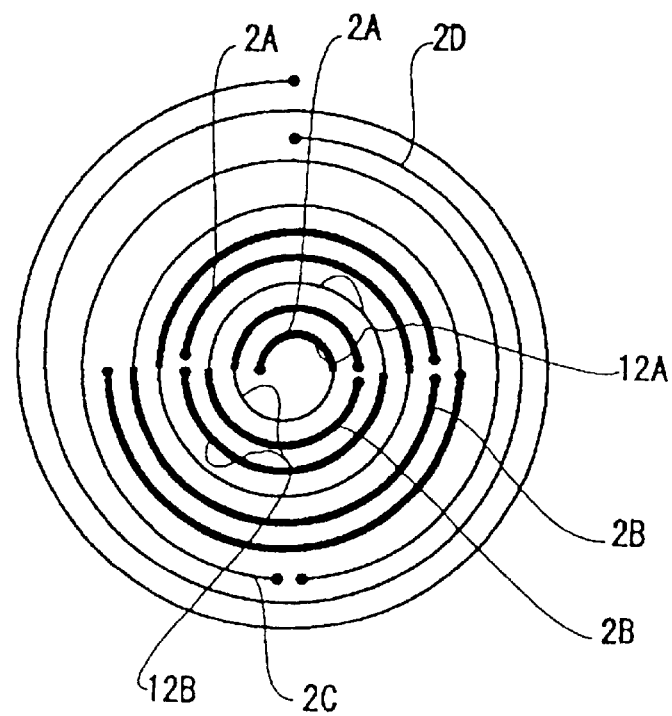
FIG. 2B shows a winding state of the prepreg shown in FIG. 2A.
Figure 3A:
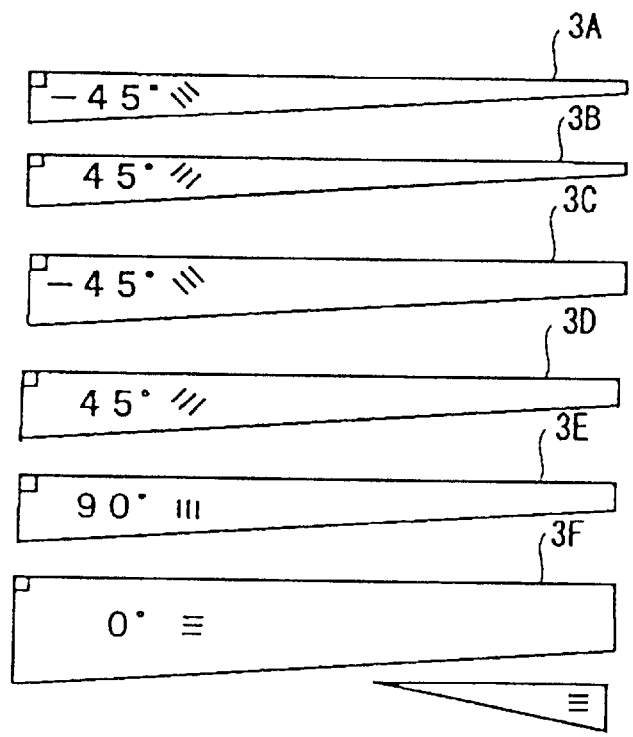
FIG. 3A is a development view showing a prepreg constituting a shaft of a first comparison example.
Figure 3B:
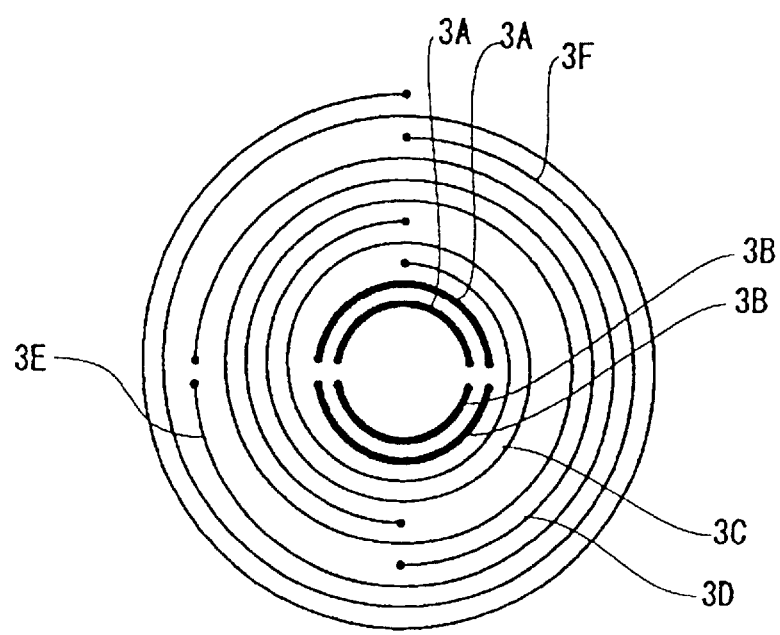
FIG. 3B shows a winding state of the prepreg shown in FIG. 3A.

The golf club shaft of the embodiment of the present invention will be described below with reference to comparison examples.

Golf club shafts of first and second embodiments and first through third comparison examples having specifications shown in table 1 are prepared.

TABLE 1

| | weight of shaft (g) | turns of angle layer | inclination of angle layer (°) | anisotropy-imparting method | bending twist amount (°) | flexure amount (mm) | twist strength (Nm degree) |
|---|---|---|---|---|---|---|---|
| com. example 1 | 55 | 2 | 45 | 0.5 method | 0.5 | 168 | 675 |
| com. example 2 | 55 | 2 | 45 | 1.5 method | 0.5 | 166 | 1540 |
| com. example 3 | 71 | 2 | 45 | 1.5 method | 0.4 | 113 | 3040 |
| embodiment 1 | 55 | 2 | 35 | 1.5 method | 0.9 | 111 | 4420 |
| embodiment 2 | 55 | 2 | 20 | 1.5 method | 2.1 | 86 | 3430 |

Numerical values attached to each prepreg of FIGS. 1A through 5A indicate the orientation angle of reinforcing fiber thereof with respect to the axis of each shaft. A triangular prepreg sheet shown in FIGS. 1A through 5A at the lowermost position thereof indicates a reinforcing prepreg to be wound on the end of a small-diameter side of the shaft on which a club head is installed.

Prepregs of the embodiments and the comparison examples whose reinforcing fibers have orientation angles of 0°, −20°, +20°, −35°, +35°, −45°, and +45° with respect to the axis of each shaft are all carbon fiber reinforced resin prepreg 8055S-12 manufactured by Toray Corp (thickness: 0.1053 mm, content of carbon fiber: 76 wt %, CF tensile modulus of elasticity: 30,000 kg, and CF tensile strength: 560 kgf). A prepreg whose reinforcing fiber has an orientation angle of 90° is prepreg 805-3 manufactured by Toray Corp (thickness: 0.0342 mm, content of carbon fiber: 60 wt %, CF tensile modulus of elasticity: 30,000 kg, and CF tensile strength: 410 kgf).

The angle layer shown in table 1 means a prepreg which generates an anisotropy on the shaft. The number of turns of the angle layer shown in table 1 means the number of turns of the prepreg wound on the shaft in its circumferential direction. The angle layer inclination shown in table 1 means an inclination of the reinforcing fiber of the angle layer with respect to the axis of the shaft. In table 1, 0.5 method means a conventional method of imparting an anisotropy to the shaft by winding first and second semicircumference-long prepregs (semi-circumference-long angle layer) in a first semicircumference region (0°≦θ<180°) and a second semi-circumference region (180°≦θ<360°) of the shaft in its circumferential direction thereof. The reinforcing fiber of the first prepreg and that of the second prepreg incline in opposite directions with respect to the axis of the shaft. In table 1, 1.5 method means a method adopted by the present invention to impart an anisotropy to the shaft by winding first and second angle layers by 1.5 turns in the same direction in the circumferential direction of the shaft from positions dislocated by 180° in the circumferential direction thereof. The reinforcing fiber of the first angle layer and that of the second angle layer incline in opposite directions with respect to the axis of the shaft.

As shown in table 1, the shaft of the first comparison example is an anisotropic shaft of the 0.5 method. The shaft of each of the first and second embodiments and the second and third comparison examples is an anisotropic shaft of the 1.5 method. In all of these shafts, the number of turns of the angle layers to be used is two to allow anisotropy-generating conditions to be approximate to one another. The length (whole length) of each shaft is 1143 mm.

In the shaft of the first comparison example (FIGS. 3A and 3B), each of prepregs 3A and 3B is a semicircumference-long prepreg (angle layer). The reinforcing fiber of each of the prepregs 3A and 3B has an orientation angle (inclination) of −45° and +45°, respectively with respect to the axis of the shaft. Two layers of the prepregs 3A and 3B are wound in a first semicircumference region (0°≦θ<180°) of the shaft and a second semicircumference region (180°≦θ<360°) thereof, respectively. Each of prepregs 3C and 3D is a two-circumference-long prepreg, i.e., wound by two turns. The reinforcing fiber of each of the prepregs 3C and 3D has an orientation angle (inclination) of −45° and +45°, respectively with respect to the axis of the shaft. A prepreg 3E is a one-circumference-long prepreg, i.e., wound by one turn, with the orientation angle of the reinforcing fiber thereof with respect to the axis of the shaft being 90°. A prepreg 3F is a two-circumference-long prepreg, i.e., wound by two turns, with the reinforcing fiber thereof being parallel with the axis of the shaft. The semicircumference-long prepregs 3A and 3B wound by two turns impart an anisotropy to the shaft.

In the shaft of the second comparison example (FIG. 4A and 4B), prepregs 4A and 4B are 1.5-circumference-long prepregs, i.e., wound by 1.5 turns. The reinforcing fiber of each of the prepregs 4A and 4B has an orientation angle (inclination) of −45° and +45°, respectively with respect to the axis of the shaft. The number of the prepregs 4A and 4B to be used is two, respectively. The prepregs 4A and 4B are wound, with the winding start points thereof being dislocated at 180° in the circumferential direction of the shaft. A prepreg 4C is a one-circumference-long prepreg, i.e., wound by one turn, with the orientation angle of the reinforcing fiber thereof being 90° with respect to the axis of the shaft. A prepreg 4D is a two-circumference-long prepreg, i.e., wound by two turns, with the reinforcing fiber thereof being parallel with the axis of the shaft. An anisotropy is imparted to the shaft by a first layered part 40A and a second layered part 40B. The first layered part 40A is formed of the first 0.5 turns (shown with heavy line) of the 1.5-turn prepreg 4A, the third 0.5 turns (shown with heavy line) thereof, and the second 0.5 turns (shown with thin line) of the 1.5-turn prepreg 4B, namely, the 0.5 turns intermediate between the first 0.5 turns thereof and the third 0.5 turns thereof. The second layered part 40B is formed of the first 0.5 turns (shown with heavy line) of the 1.5-turn prepreg 4BA, the third 0.5 turns (shown with heavy line) thereof, and the second 0.5 turns (thin line) of the 1.5-turn prepreg 4A, namely, the 0.5 turns intermediate between the first 0.5 turns thereof and the third 0.5 turns thereof.

Figure 4A:
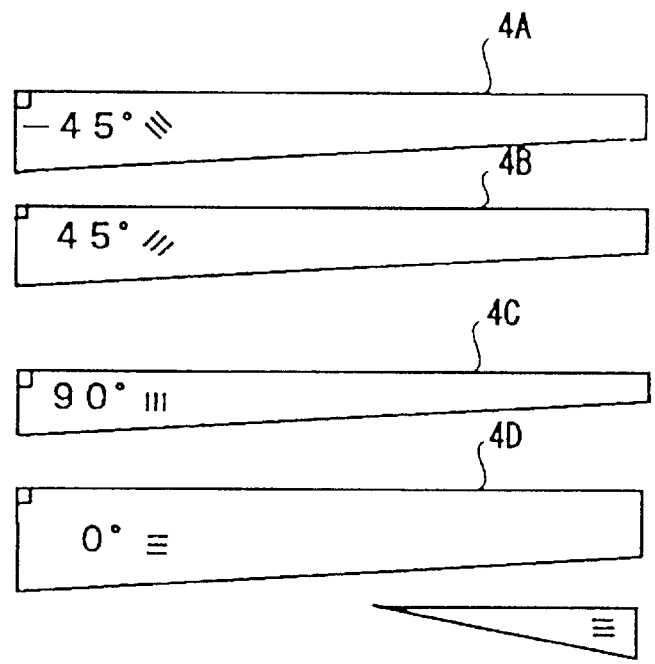
FIG. 4A is a development view showing a prepreg constituting a shaft of a second comparison example.
Figure 4B:
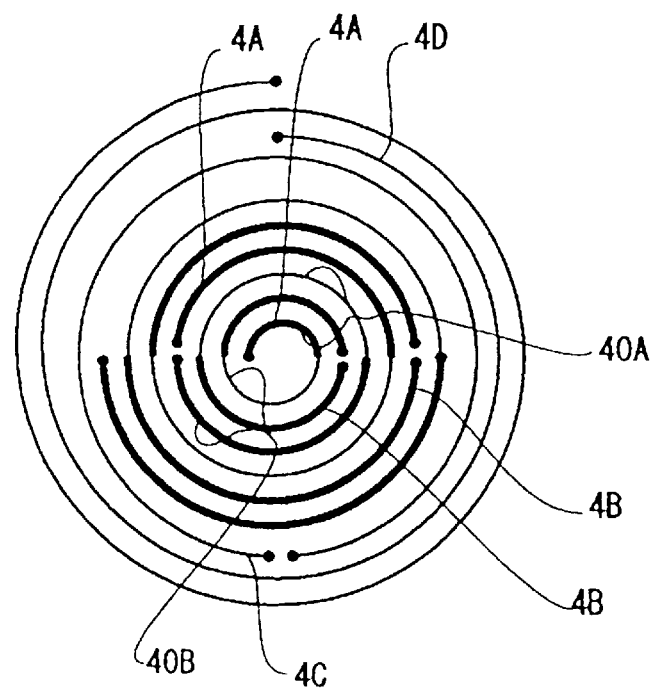
FIG. 4B shows a winding state of the prepreg shown in FIG. 4A.
Figure 5A:
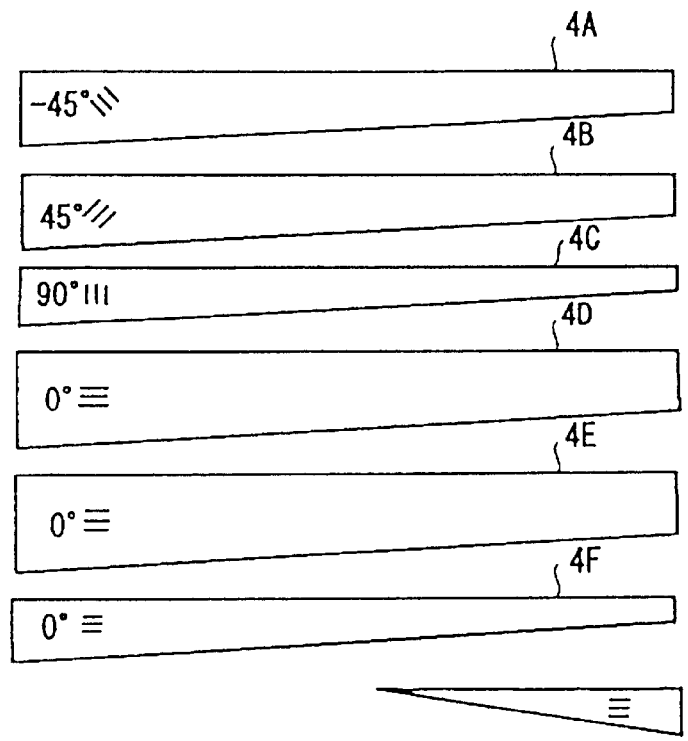
FIG. 5A is a development view showing a prepreg constituting a shaft of a third comparison example.
Figure 5B:
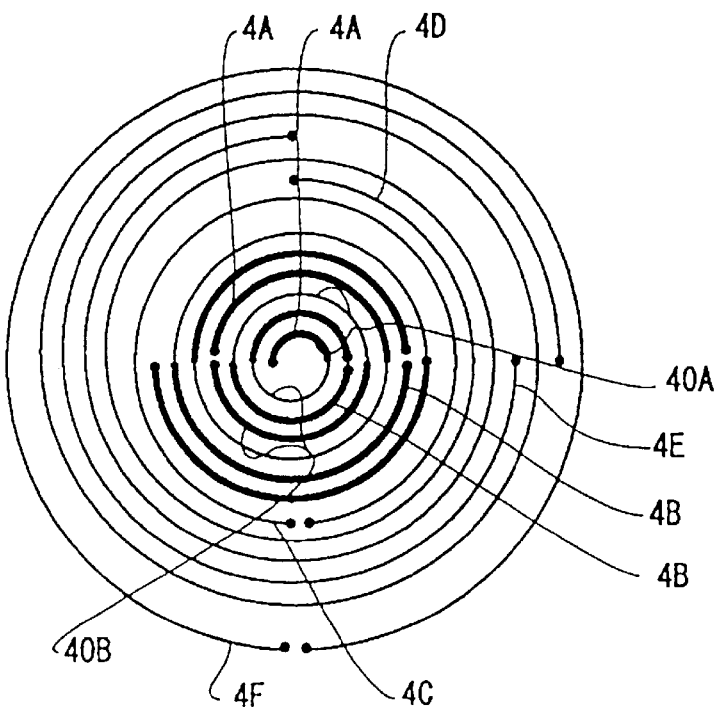
FIG. 5B shows a winding state of the prepreg shown in FIG. 5A.

In the shaft of the third comparison example (FIGS. 5A and 5B), a two-circumference-long prepreg 4E and a one-circumference-long prepreg 4F are additionally wound on the outermost layer (4D) of the shaft of the second comparison example (FIGS. 4A and 4B). The reinforcing fiber of each of the prepregs 4E and 4F orients in parallel with the axis of each shaft.

In the shaft of the first embodiment (FIGS. 1A and 1B), prepregs 1A and 1B are 1.5-circumference-long prepreg, i.e., wound by 1.5 turns. The reinforcing fiber of each of the prepregs 1A and 1B has an orientation angle (inclination) of −35° and +35°, respectively with respect to the axis of the shaft. The number of the prepregs 1A and 1B to be used is two, respectively. The prepregs 1A and 1B are wound, with the winding start points thereof being dislocated at 180° in the circumferential direction of the shaft. That is, the shaft has two pairs of angle layers, namely, first and second angle layers. The winding start positions of the two first angle layers are equivalent to each other in the circumferential direction of the shaft. The winding start positions of the two second angle layers are also equivalent to each other in the circumferential direction of the shaft. Consequently, the winding termination positions of the two first angle layers are equivalent to each other in the circumferential direction of the shaft, and the winding termination positions of the two second angle layers are also equivalent to each other in the circumferential direction of the shaft. A prepreg 1C is a one-circumference-long prepreg, i.e., wound by one turn, with the reinforcing fiber thereof orienting perpendicularly to the axis of the shaft. A prepreg 1D is a two-circumference-long prepreg, i.e., wound by two turns, with the reinforcing fiber thereof orienting in parallel with the axis of the shaft. An anisotropy is imparted to the shaft by a first layered part 11A and a second layered part 11B. The first layered part 11A is formed of the first 0.5 turns (shown with heavy line) of the 1.5-turn prepreg 1A, the third 0.5 turns (shown with heavy line) thereof, and the second 0.5 turns (shown with thin line) of the 1.5-turn prepreg 1B. The second layered part 11B is formed of the first 0.5 turns (shown with heavy line) of the 1.5-turn prepreg 1B, the third 0.5 turns (shown with heavy line) thereof, and the second 0.5 turns (shown with thin line) of the 1.5-turn prepreg 1A.

In the shaft of the second embodiment (FIGS. 2A and 2B), prepregs 2A and 2B are 1.5-circumference-long prepregs, i.e., wound by 1.5 turns. The reinforcing fiber of each of the prepregs 2A and 2B has an orientation angle (inclination) of −20° and +20°, respectively with respect to the axis of the shaft. The number of the prepregs 2A and 2B to be used are two, respectively. The prepregs 2A and 2B are wound, with the winding start points thereof being dislocated at 180° in the circumferential direction of the shaft. That is, the shaft has two pairs of angle layers, namely, first and second angle layers. The winding start positions of the two first angle layers are equivalent to each other in the circumferential direction of the shaft. The winding start positions of the two second angle layers are also equivalent to each other in the circumferential direction of the shaft. Consequently, the winding termination positions of the two first angle layers are equivalent to each other in the circumferential direction of the shaft, and the winding termination positions of the two second angle layers are also equivalent to each other in the circumferential direction of the shaft. A prepreg 2C is a one-circumference-long prepreg, i.e., wound by one turn, with the reinforcing fiber thereof orienting perpendicularly to the axis of the shaft. A prepreg 2D is a two-circumference-long prepreg, i.e., wound by two turns, with the reinforcing fiber thereof orienting in parallel with the axis of the shaft. An anisotropy is imparted to the shaft by a first layered part 12A and a second layered part 12B. The first layered part 12A is formed of the first 0.5 turns (shown with heavy line) of the 1.5-turn prepreg 2A, the third 0.5 turns (shown with heavy line) thereof, and the second 0.5 turns (shown with thin line) of the 1.5-turn prepreg 2B. The second layered part 12B is formed of the first 0.5 turns (shown with heavy line) of the 1.5-turn prepreg 2B, the third 0.5 turns (shown with heavy line) thereof, and the second 0.5 turns (shown with thin line) of the 1.5-turn prepreg 2A.

The shaft of the first and second embodiments have the same construction as that of the second comparison example except that the orientation angle (−35° and +35°, −20° and +20°) of the reinforcing fiber of the prepreg forming the anisotropic layer of the shaft of the former is differentiated from that (−45° and +45°) of the reinforcing fiber of the prepreg forming the anisotropic layer of the shaft of the latter.

In the shaft of the all of the embodiments and the comparison examples, the prepregs are wound by six turns, with the reinforcing fibers thereof inclining with respect to the axis of each shaft.

Bending twist amounts, flexure amounts (bending rigidities), and twist strengths Nm of the shafts of the embodiments and the comparison examples were measured. Table 1 shows the result.

[Bending Twist Amounts]

Figure 6A:
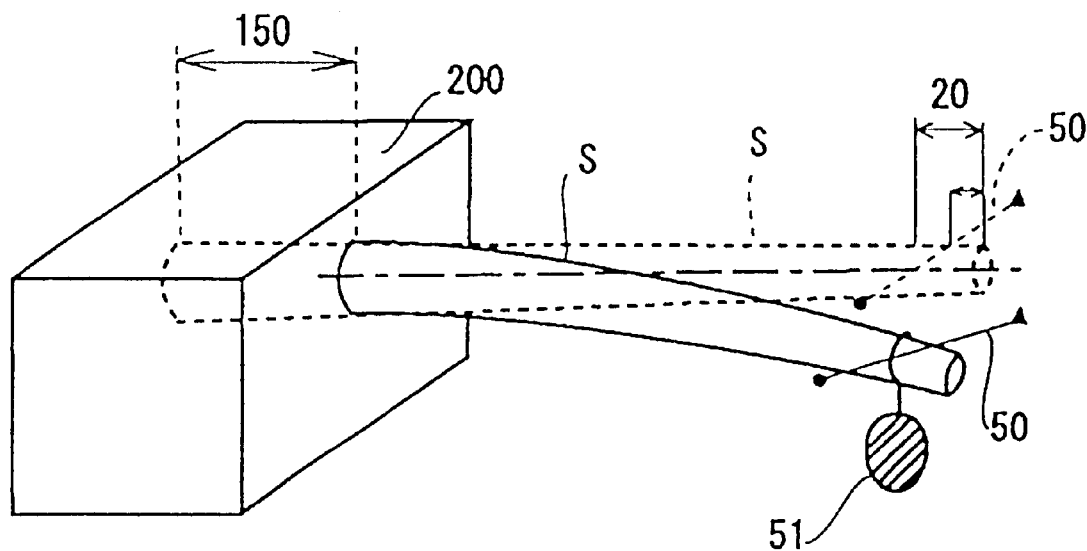
FIGS. 6A and 6B are side views showing a method of measuring a bending twist amount of each golf club shafts
Figure 6B:
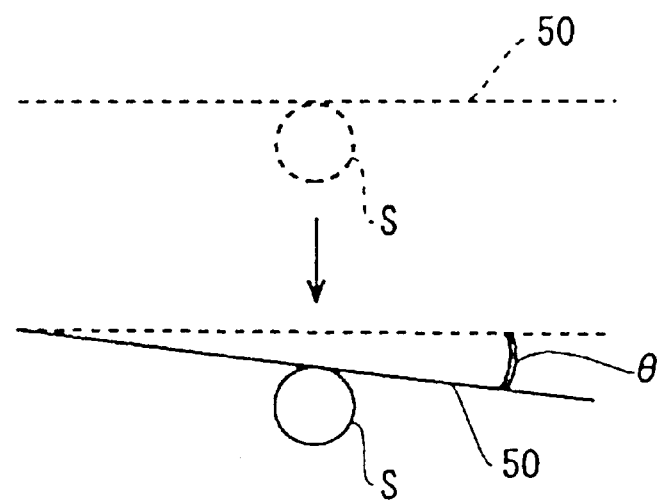
Figure 7:
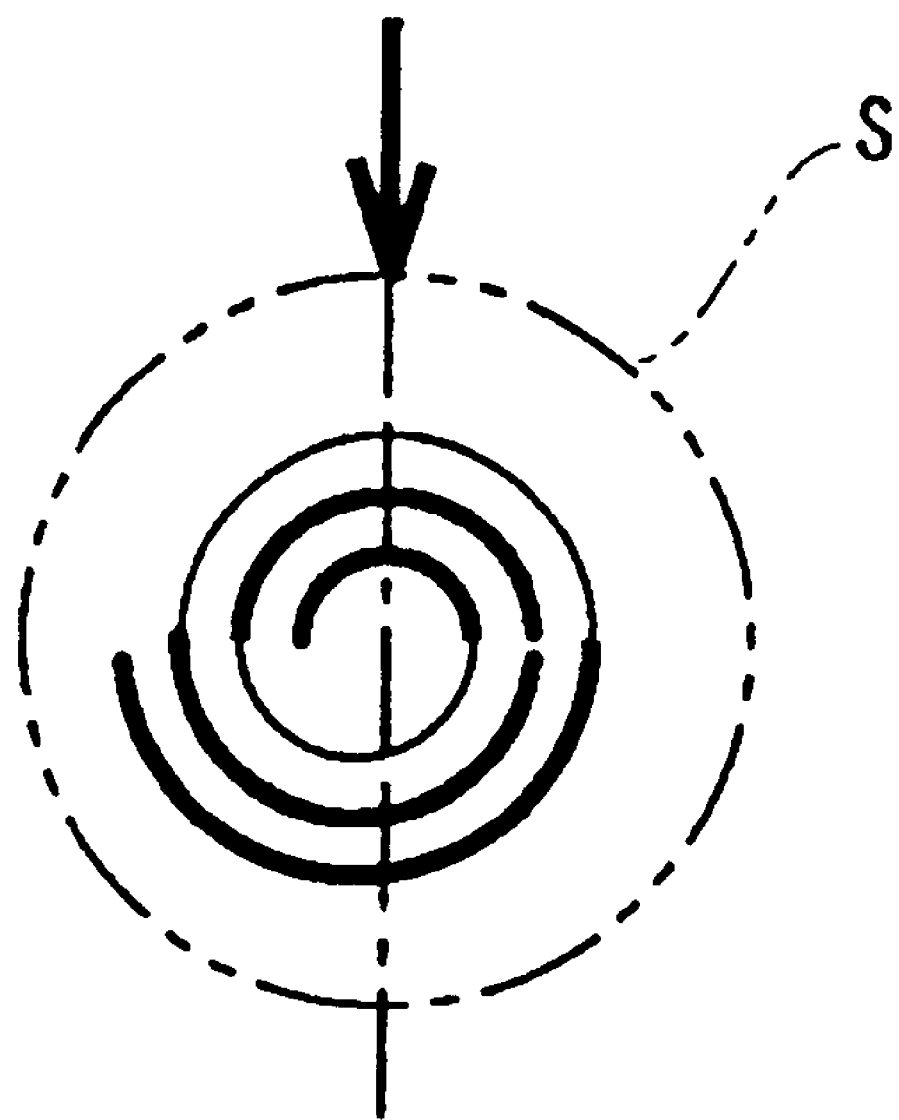
FIG. 7 shows the relationship between a load-applied direction and the position of an anisotropic layer in a method of measuring a bending twist amount of the golf club shaft shown in FIG. 6.

As shown in FIGS. 6A and 6B, a shaft S was held by a chucking device 200 which chucked a portion of the shaft 12 spaced at 150 mm from the end of the shaft S at the large-diameter side thereof, with the shaft S held horizontally. A weight 51 was hung from the shaft S at a position 20 mm spaced from the end at the small-diameter side thereof to flex the shaft S. A mark bar 50 having a length of 140 mm was installed on the upper end of the shaft S spaced at 15 mm from the end at the small-diameter si d e thereof such that the mark bar 50 was horizontal when the weight 51 was not hung and perpendicular to the axis of the shaft S. The bending twist amount was measured by reading a rotation angle (θ) of the mark bar 50. The bending twist amount changes in the circumferential direction of the shaft S of each of the embodiments and the comparison examples. The bending twist amount of the shaft S of each of the embodiments and the comparison examples shown in table 1 indicates the maximum value thereof. The bending twist amount was measured by so bending the shaft S that a line connecting the centers of the anisotropic layers opposed to each other was vertical, as shown in FIG. 7.

[Flexure Amount]

Figure 8:
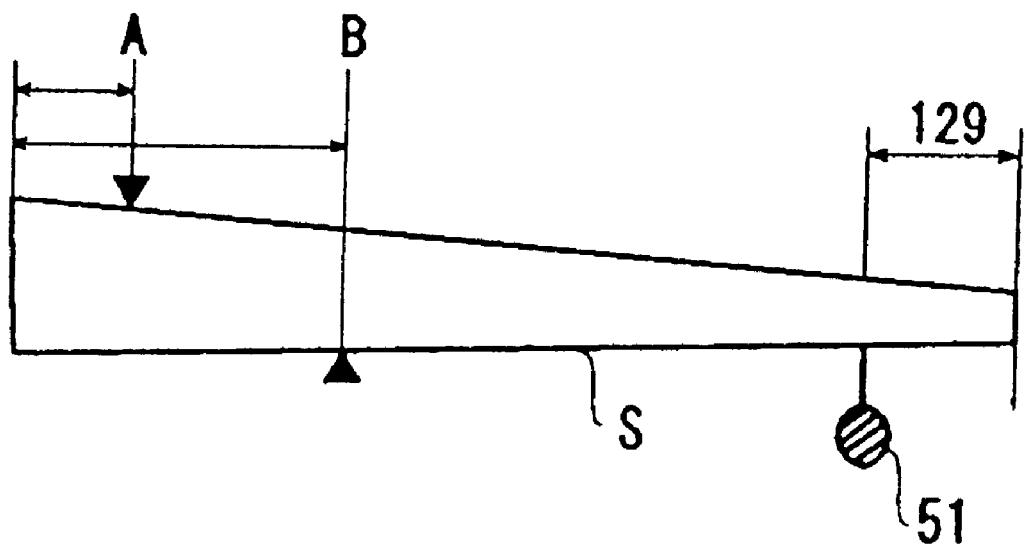
FIG. 8 shows a bending strength test of each shaft.

As shown in FIG. 8, the large-diameter side of the shaft S was fixed by supporting a position A spaced at 104 mm from the end of the shaft S at its large-diameter side and supporting a position B spaced at 140 mm from the position A. A weight 51 of 2.7 kg was hung at the lower end of a position C spaced at 129 mm from the end of the shaft S at its small-diameter side. In this condition, a flexure amount of each shaft S at the position of the weight 51 was measured.

[Twist Failure Strength]

Figure 9:
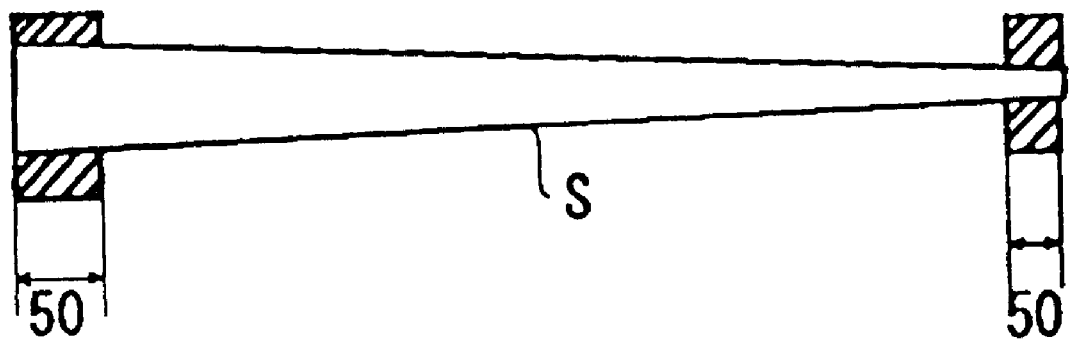
FIG. 9 shows a twist failure strength test of each shaft.
Figure 10:
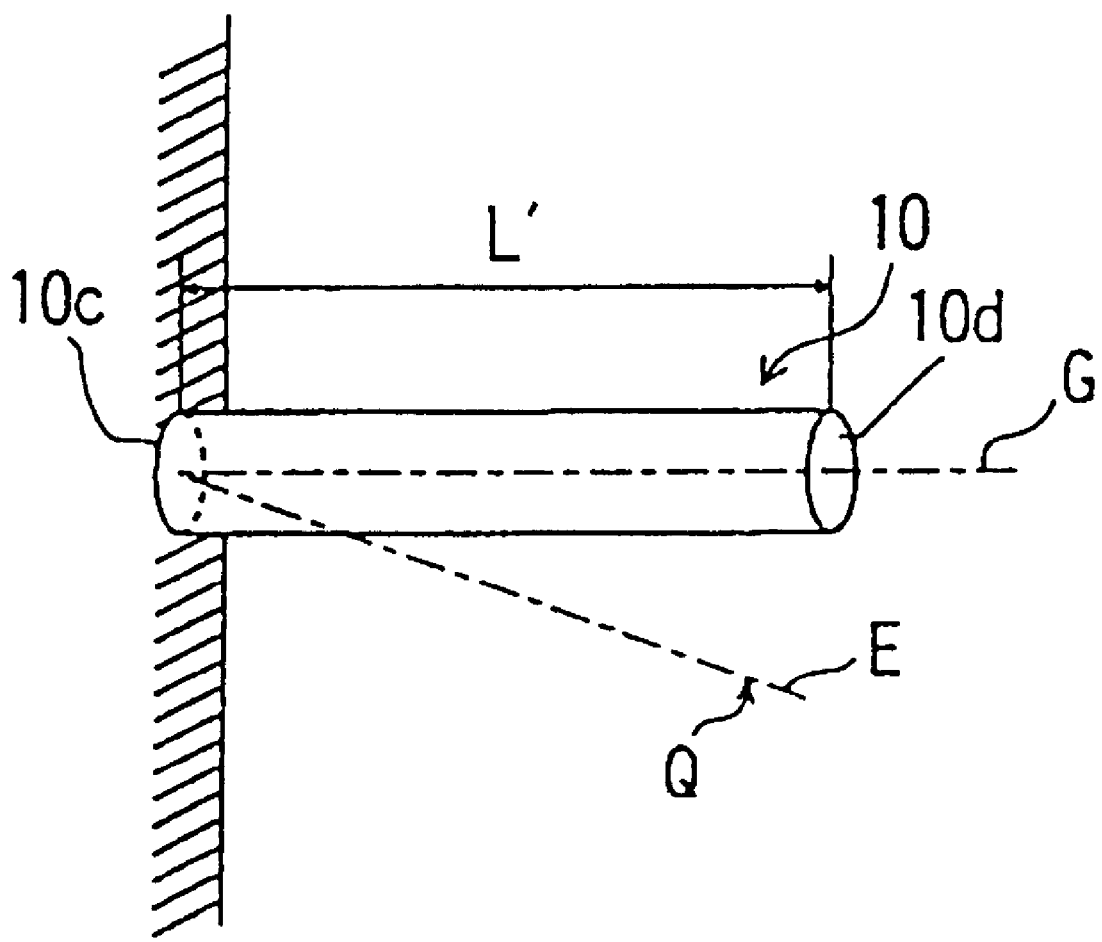
FIG. 10 is a schematic view showing the relationship between an elastic main axis and a geometric main axis of an anisotropic hollow shaft.
Figure 11A:
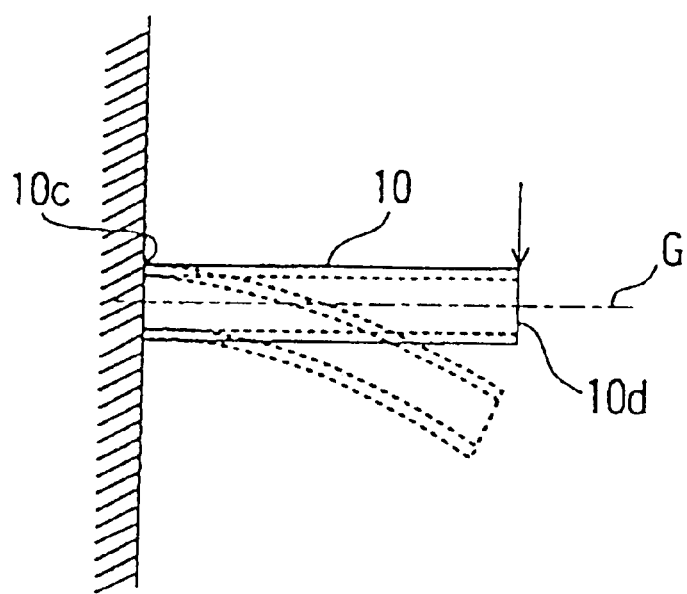
FIG. 11A is a side view showing a state in which a load is applied to the anisotropic hollow shaft shown in FIG. 10.
Figure 11B:
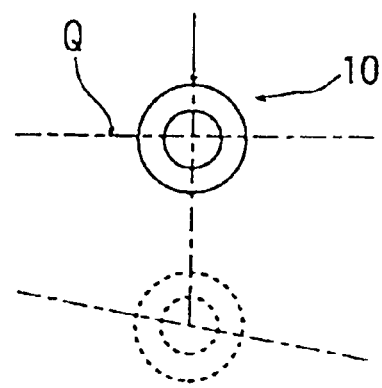
FIG. 11B is a schematic view showing a deformational behavior of the anisotropic hollow shaft shown in FIG. 10.

A test was conducted in accordance with "Admittance standard of golf club shaft" specified by Product Safety Association. As shown in FIG. 9, both ends of the shaft S having a width of 50 mm respectively were fixed. In this state, a torque was applied to the shaft S. A product of a torque (Nm) and a rotation angle (degree) when the shaft S was destroyed was set as the evaluation value.

An anisotropy is imparted to the shaft of the first comparison example by the conventional 0.5 method of using semicircumference-long prepregs. An anisotropy is imparted to the shaft of the second comparison example by the 1.5 method of using 1.5-turn prepregs proposed by the present invention. In the shafts of the first and second comparison examples, the orientation angle (−45°, 45°) of the reinforcing fiber of the angle layer is the same and the weights are both 55 g. The anisotropy-imparted shaft of the second comparison example adopting the 1.5 method of using the 1.5-turn prepregs proposed by the present invention has a twist strength a little higher than the anisotropy-imparted shaft of the first comparison example adopting the 0.5 method of using the conventional 0.5-turn prepregs. The number of turns of prepregs of the shaft of the second comparison example is smaller than that of prepregs of the shaft of the first comparison example. Further, in the shaft of the second comparison example, it is unnecessary to butt edges of the semicircumference-long prepregs. Thus, the time period required to produce the shaft of the second comparison example is less than that required to produce the shaft of the first comparison example. But each of the shafts of the first and second comparison examples has a flexure amount (bending rigidity) as large as more than 160 mm. Thus, both shafts are too soft for most golfers to use. Moreover, the twist strength of the shaft of the second comparison example is not as high as those of the fist and second embodiments.

In the shaft of the third comparison example, to improve the bending rigidity of the shaft of the second comparison example, the straight layer (two-circumference-long prepreg 4E whose reinforcing fiber is parallel with the axis of the shaft) is added to the outermost layer of the shaft of the second comparison example. Consequently, the shaft of the third comparison example has an improved twist failure strength and a reduced flexure amount of 113 mm. That is, the shaft of the third comparison example has an improved bending rigidity. However, the weight of the shaft is increased to 71 g because of the formation of the straight layer.

In order to increase the bending rigidity of the shaft, the winding amount of the prepreg is increased as in the case of the shaft of the third comparison example. In addition, it is known that the bending rigidity of the shaft is increased by enhancing the modulus of elasticity of the reinforcing fiber of the prepreg. But this method reduces the bending rigidity of the shaft greatly. Consequently, a shaft having a weight as small as 55 g has a high degree of reduction of the bending rigidity, which means that the shaft has a very low strength.

The shaft of each of the first and second embodiments has the same construction as that of the shaft of the second comparison example except that the orientation angle (−35° and 35°, −20° and 20°) of the reinforcing fiber of the prepreg (angle layer) of the former is different from that (−45° and 45°) of the reinforcing fiber of the prepreg of the shaft of the latter. The weight of the shaft of the second comparison example and that of each of the shaft of the first and second embodiments are all 55 g. But the flexure value of the shaft of the first embodiment and that of the shaft of the second embodiments are 111 mm and 86 mm, respectively which are smaller than that (113 mm) of the shaft of the second comparison example. That is, the bending rigidity of the shaft of each of the first and second embodiments is higher than that of the shaft of the second comparison example. Further, the twist failure strength of the shaft of each of the first and second embodiments is higher than that of the shaft of the second comparison example.

As apparent from the above-described construction, the first angle layer and the second angle layer whose reinforcing fibers incline in opposite directions at the angle 20°–35° with respect to the axis of the golf club shaft are dislocated at 180° in the circumferential direction of the golf club shaft. The first angle layer and the second angle layer are wound by 1.5 turns in a cross-sectional face of the golf club shaft. There are formed the layered part consisting of two first angle layers and one second angle layer layered one upon another and the layered part consisting of one first angle layer and two second angle layers layered one upon another. Thus, it is possible to obtain the anisotropic shaft more lightweight than the conventional shaft and having a high degree of bending rigidity and strength suitable for practical use.

As apparent from the above-described construction, according to the present invention, two semicircumference-long prepregs are not wound on the circumferential surface of the shaft, but the first and second angle layers inclining in opposite directions at an angle 20°–35° with respect to the axis of the shaft are wound thereon by 1.5 turns in a cross-sectional face of the shaft. Thus, the shaft is allowed to have an anisotropy and a very high degree of bending rigidity. According to the present invention, using a small winding amount of fiber reinforced resinous layers, it is possible to construct the anisotropic shaft without dividing the fiber reinforced resinous layer into two circular-arcs in the cross-sectional face of the shaft. That is, it is possible to provide the anisotropic golf club shaft which is more lightweight, has a higher degree of bending rigidity and strength than the conventional anisotropic golf club shaft.

What is claimed is:

1. An anisotropic golf club shaft comprising a laminate of a plurality of fiber reinforced resinous layers having one pair of angle layers consisting of, relative to the center of the shaft, a centermost first angle layer and a centermost second angle layer, or having a plurality of pairs of angle layers consisting of first and second angle layers, such that a fiber of said first angle layer(s) and that of said second angle layer(s) incline in opposite directions at an angle 20°–35° with respect to an axis of said golf club shaft, wherein:

said first angle layer(s) and said second angle layer(s) are wound by only 1.5 turns in a cross-sectional face of said golf club shaft and said 1.5 turns of said first and second angle layers continue along an axis of said shaft;

a winding start point of said first and that of said second angle layers are dislocated at 180° in a circumferential direction of said golf club shaft; and in a cross-sectional face of said golf club shaft, a part consisting of two first angle layers and one second angle layer layered one upon another and a part consisting of one first angle layer and two second angle layers layered one upon another are formed to differentiate constructions consisting of said first and second angle layers of both of said parts.

2. The anisotropic golf club shaft according to claim 1, wherein a plurality of pairs of angle layers consisting of said first and said second angle layers is formed; winding start positions of said first angle layers are equivalent to each other in the circumferential direction of said golf club shaft; and winding start positions of said second angle layers are equivalent to each other in the circumferential direction of said golf club shaft.

3. The anisotropic golf club shaft according to claim 2, wherein said fiber reinforced resinous layers include a hoop layer whose fiber inclines at 90° with respect to said axis of said golf club shaft and a straight layer whose fiber inclines at 0° with respect to said axis of said golf club shaft; and said hoop layer and said straight layer are wound by one turn or integral turns in the circumferential direction of said golf club shaft by dislocating a winding start position of said hoop layer and that of said straight layer by 90° from a winding start position of said first angle layer and that of said second angle layer in the circumferential direction of said golf club shaft; and a dividing line passing through said winding start position of said first angle layer and that of said second angle layer is not divided by said hoop layer and said straight layer.

4. The anisotropic golf club shaft according to claim 1, wherein said fiber reinforced resinous layers include a hoop layer whose fiber inclines at 90° with respect to said axis of said golf club shaft and a straight layer whose fiber inclines at 0° with respect to said axis of said golf club shaft; and said hoop layer and said straight layer are wound by one turn or integral turns in the circumferential direction of said golf club shaft by dislocating a winding start position of said hoop layer and that of said straight layer by 90° from a winding start position of said first angle layer and that of said second angle layer in the circumferential direction of said golf club shaft; and a dividing line passing through said winding start position of said first angle layer and that of said second angle layer is not divided by said hoop layer and said straight layer.

5. The anisotropic golf club shaft according to claim 4, wherein said second angle layer is positioned directly on a periphery of said first angle layer by locating a winding start point of said second angle layer in continuation from a winding termination point of said first angle layer; said hoop layer is positioned on a periphery of said second angle layer; and said straight layer is positioned on a periphery of said hoop layer such that said straight layer is positioned on an outermost surface.

* * * * *